United States Patent
Huang et al.

(10) Patent No.: US 6,788,632 B2
(45) Date of Patent: Sep. 7, 2004

(54) METHOD AND APPARATUS FOR CHANGING REGION CODE OF DIGITAL VERSATILE DISC DRIVE

(75) Inventors: Yi-Chih Huang, Taipei Hsien (TW); Kun-Long Lin, Taipei Hsien (TW)

(73) Assignee: VIA Technologies Inc., Taipei Hsien (TW)

( * ) Notice: Subject to any disclaimer, the term of this patent is extended or adjusted under 35 U.S.C. 154(b) by 352 days.

(21) Appl. No.: 10/063,085

(22) Filed: Mar. 17, 2002

(65) Prior Publication Data

US 2002/0172082 A1 Nov. 21, 2002

(30) Foreign Application Priority Data

May 18, 2001 (TW) .................................... 90112007 A

(51) Int. Cl.[7] .............................................. G11B 5/09
(52) U.S. Cl. ................................ 369/53.21; 369/59.23
(58) Field of Search ........................... 369/53.2, 53.21, 369/59.23, 59.24, 84, 85, 83, 30.05, 30.07, 30.18, 30.19

(56) References Cited

U.S. PATENT DOCUMENTS

| | | | | |
|---|---|---|---|---|
| 5,249,166 A | * | 9/1993 | Hamilton et al. | 369/85 |
| 5,691,972 A | * | 11/1997 | Tsuga et al. | 369/53.21 |
| 5,930,504 A | | 7/1999 | Gabel | |
| 6,141,483 A | * | 10/2000 | Yamada et al. | 386/95 |
| 6,614,732 B2 | * | 9/2003 | Nonaka et al. | 369/53.2 |

* cited by examiner

*Primary Examiner*—Thang V. Tran
(74) *Attorney, Agent, or Firm*—Winston Hsu

(57) ABSTRACT

A digital versatile disc (DVD) drive has a first memory for storing a region code and a source code, and a second memory for storing data temporarily. The method for changing the region code of the digital versatile disc drive comprises storing the source code in the second memory, and changing the region code in the first memory according to the source code stored in the second memory. The method and apparatus is capable of changing the region code of the digital versatile disc drive.

10 Claims, 4 Drawing Sheets

METHOD AND APPARATUS FOR CHANGING REGION CODE OF DIGITAL VERSATILE DISC DRIVE

BACKGROUND OF INVENTION

1. Field of the Invention

The invention relates to a method and apparatus for changing a region code of a digital versatile disc (DVD) drive.

2. Description of the Prior Art

In modern society, there has been a spread in the use of optical storage medium, such as compact discs, as optical storage media for recording a huge amount of high-density digital information. The optical storage medium has advantages of lightweight, low-price, and large capacity for data storage. As the result of recent research and development, digital versatile disc (DVD) is developed. The development of DVD has brought a dramatic increase in storage capacity, especially suitable for video and audio data. Such DVD has a storage capacity of 4.7 GB (gigabytes), so that video with superior image quality to video compact discs (VCD) can be stored, and the maximum reproduction time can be increased to allow the recording of long titles. For these reasons, DVD allows the storage of movies with long reproduction time and high picture quality, making DVD more suitable for AV (audio-video) application and data storage.

In order to protect the copyrights of video data on DVD, DVD is stipulated to include a particular region code. Meanwhile, digital versatile disc drives used for reading data on DVD also include a particular region code. Before a DVD drive can read video data on a DVD, the DVD drive first has to check whether region code of the DVD and the DVD drive are identical. If the region code of the DVD is not the same as the region code of the DVD drive, the DVD drive cannot read the data on the DVD. Conversely, when the two region codes are identical, the DVD drive can read data accurately.

The establishment of the above-mentioned region code system was made to protect the copyrights of video data on DVD. Nevertheless, the reasonable right of users to read video data on DVD needs to be taken into consideration. Therefore, a DVD drive is designed to be capable of changing its region code within fixed times, such as six times typically. For providing the above-mentioned function, a DVD drive stores a value in a counter for recording the number of times the region code of the DVD drive has been changed. When a region code of a DVD is not the same as the region code of the DVD drive, the DVD drive then checks the value stored in the counter to determine whether the value of the counter is smaller than the default value. If the value in the counter is smaller than the fixed value, the DVD drive is allowed to change its region code so as to read video data on DVD. The DVD drive then sends a message to ask a user whether or not to change the region code of the DVD drive. If the user does not want to change the region code of the DVD drive, the DVD drive cannot read video data on DVD. On the other hand, when the user requests that the DVD drive to change the region code, the DVD drive changes the region code stored in the DVD drive the same as the region code of DVD. Meanwhile, the value in the counter is incremented by one to represent the number of times that the region code of the DVD drive has been changed. That is, each time the user changes the region code of the DVD drive, the value in the counter is required to be incremented by one. However, when the value in the counter exceeds the fixed value; and the two region codes of the DVD and the DVD drive are not identical, the DVD drive sends a warning message to inform the user that video data on DVD cannot be read. Thereafter, the region code of the DVD drive is not allowed to change any more.

Furthermore, in order to complete the above-mentioned procedure, the prior DVD drive has an electrically erasable programmable read only memory (EEPROM) for storing both the value in the counter and the region code. Please refer to FIG. 1. FIG. 1 is a functional block diagram of a prior DVD drive 10. The DVD drive 10 comprises a controller 12 electrically connected to a volatile memory module 18, a non-volatile memory 14 that stores a source code 14A, and an EEPROM 16. The controller 12 is used to control operations of the DVD drive 10 according to the source code 14A stored in the non-volatile memory 14. The volatile memory module 18 is used to store data temporarily required by the controller 12. The EEPROM 16 is used to store a region code 16A and a value in a counter 16B of the DVD drive 10.

When the prior DVD drive 10 receives a command for changing the region code 16A of the DVD drive 10 and the value in the counter 16B does not exceed a default value, the DVD drive 10 changes the region code 16A according to a default change procedure. Please refer to FIG. 2. FIG. 2 is a flow chart illustrating a method for the prior DVD drive 10 to change the region code 16A. The prior method comprises the following steps:

Step 102

The procedure is started for changing the region code 16A of the DVD drive 10.

Step 104

The controller 12 reads the source code 14A stored in the non-volatile memory 14 and executes the subsequent procedure of changing the region code 16A of the DVD drive 10 according to the source code 14A.

Step 106

The controller 12 erases the region code 16A and the value in the counter 16B that were originally stored in the EEPROM 16.

Step 108

The controller 12 changes the region code 16A according to the indication from a user and increments the value in the counter 16B, and then the controller 12 writes the changed region code 16A and the new value in the counter 16B into the EEPROM 16.

Step 110

The procedure of changing the region code 16A of the DVD drive 10 is completed.

Since the non-volatile memory 14 such as a flash memory is incapable of reading and writing data simultaneously and the controller 12 of the prior DVD drive 10 always has to read the source code 14A through the non-volatile memory 14, the prior DVD drive 10 has to use the EEPROM 16 to store the region code 16A and the value in the counter 16B. Therefore, the cost of the prior DVD drive 10 is substantially increased. Moreover, an additional circuit suitable for the EEPROM 16 is required in the prior DVD drive 10 for, and the design and the fabrication of the prior DVD drive 10 is more complicated.

SUMMARY OF THE INVENTION

It is therefore a primary objective of the claimed invention to provide a method and apparatus for changing a region code of a digital versatile disc drive to solve the above-mentioned problem.

According to the claimed invention, a method for changing a region code of a digital versatile disc drive is disclosed. The digital versatile disc drive has a first memory for storing the region code and a source code, and a second memory for storing data temporarily. The method comprises storing the source code in the second memory, and changing the region code in the first memory according to the source code stored in the second memory.

It is an advantage of the claimed invention that the method and apparatus is capable of changing the region code of the digital versatile disc drive so as to overcome shortcomings in the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
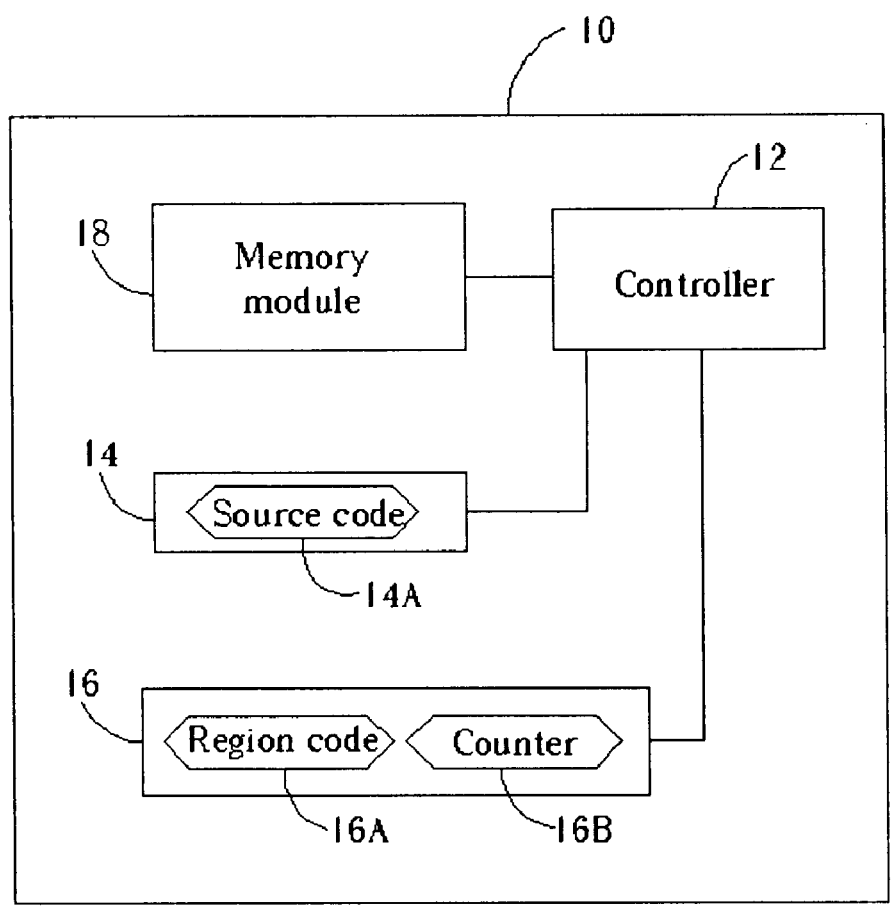
FIG. 1 is a functional block diagram of a digital versatile disc drive according to the prior art.
Figure 2:
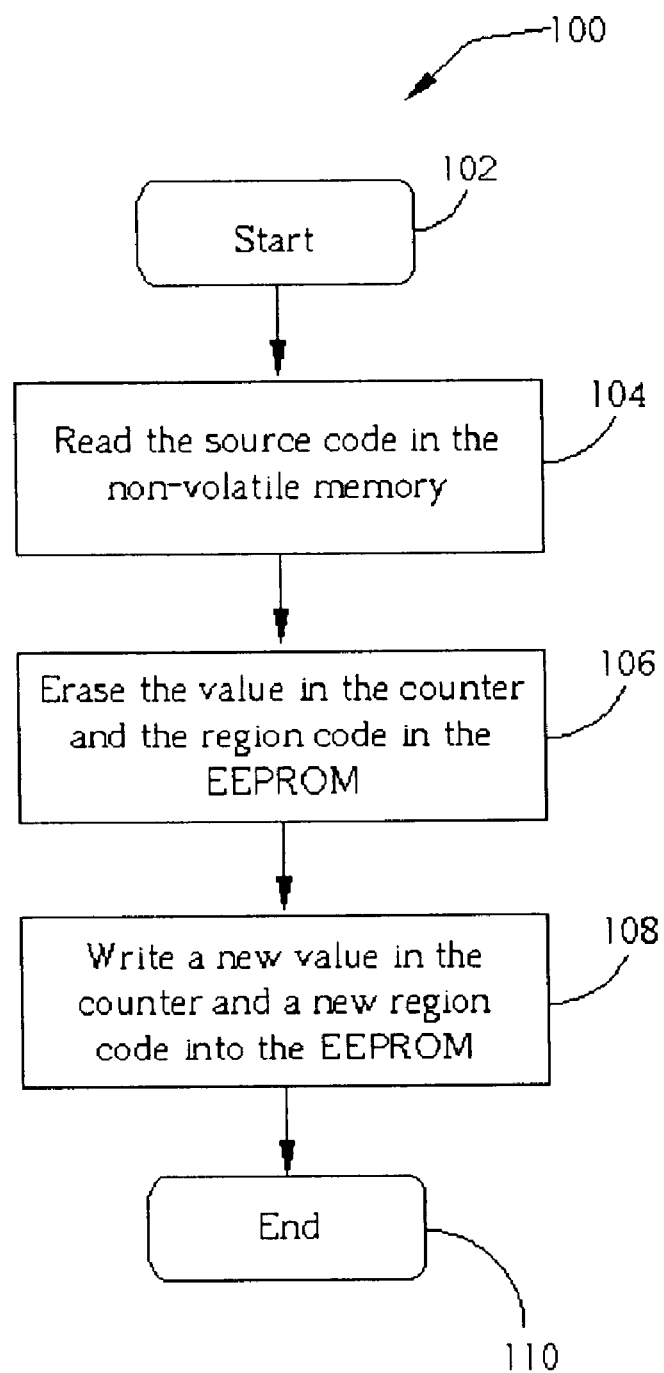
FIG. 2 is a flow chart illustrating a prior method for changing a region code.
Figure 3:
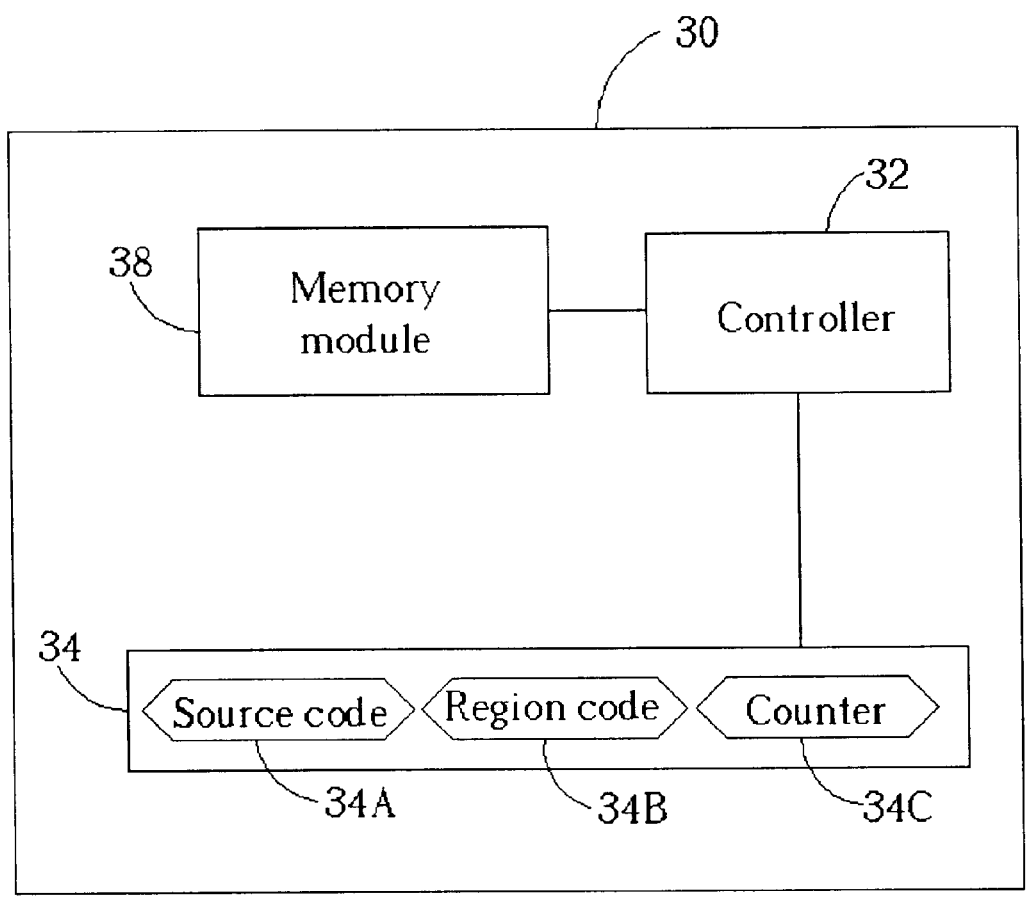
FIG. 3 is a functional block diagram of a digital versatile disc drive according to the present invention.

Please refer to FIG. 3. FIG. 3 is a functional block diagram of an optical disc drive 30 according to the present invention. The optical disc drive is for example, a digital versatile disc (DVD) drive. The DVD drive 30 comprises a controller 32 electrically connected to a non-volatile memory 34, i.e., a first memory, and a volatile memory module 38, i.e., a second memory. The controller 32 is used to control operations of the DVD drive 30. The memory module 38 is used to temporarily store data required by the controller 32. The non-volatile memory 34 is used to store a source code 34A, a region code 34B, and a value in a counter 34C simultaneously. The DVD drive 30 is controlled according to the source code 34A and determines whether the region code 34B of the DVD drive 30 can be changed further according to the value in the counter 34C. However, unlike the prior DVD drive 10, the DVD drive 30 is not required to be equipped with an additional electrically erasable programmable read only memory (EEPROM) for storing the region code 34B and the value in the counter 34C. Instead, the region code 34B, the value in the counter 34C, and the source code 34A are stored in the non-volatile memory 34 of the DVD drive 30.

Figure 4:
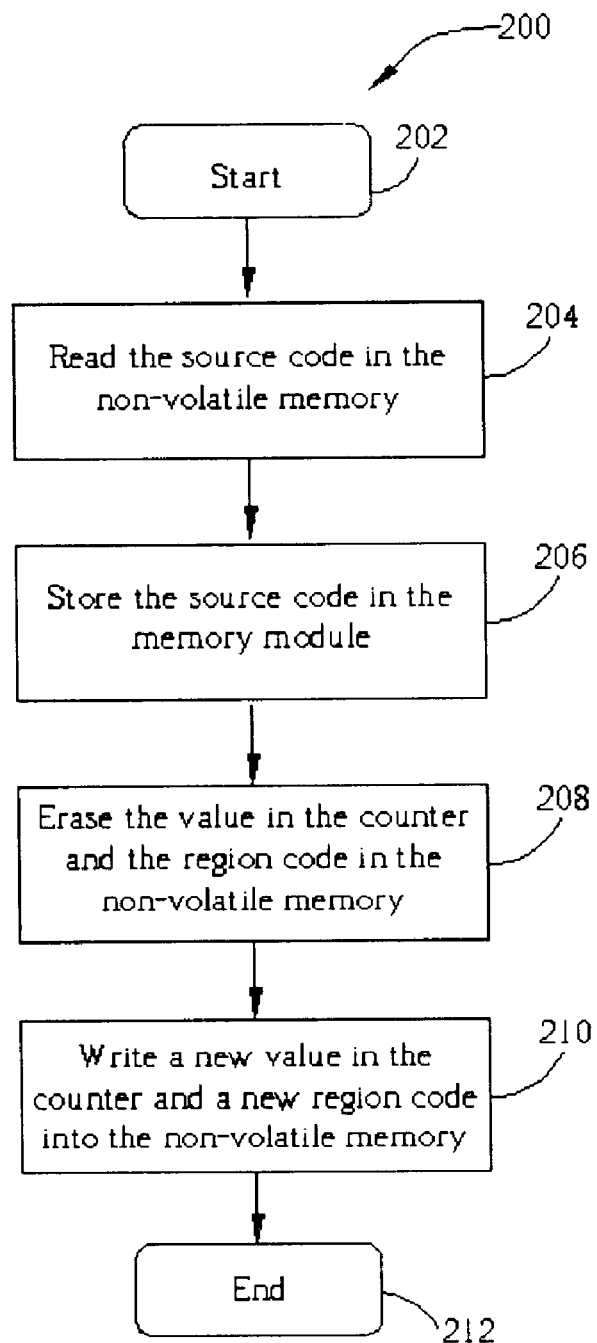
FIG. 4 is a flow chart illustrating a method for changing a region code according to the present invention.

According to the preferred embodiment of the DVD drive 30, the non-volatile memory 34 is realized by a flash memory. For the characteristics of the non-volatile memory 34, the DVD drive 30 changes the region code 34B according to a method disclosed in the invention. Please refer to FIG. 4. FIG. 4 is a flow chart illustrating the method for changing the region code 34B according to the present invention. The method comprises the following steps:

Step 202

The procedure for changing the region code 34B of the DVD drive 30 is started. Before this step, the controller 32 of the DVD drive 30 needs to confirm that the value in the counter 34C is smaller than a default value. If so, the region code 34B of the DVD drive 30 can be changed further.

Step 204

The controller 32 reads the source code 34A stored in the non-volatile memory 34.

Step 206

Since the non-volatile memory 34 cannot read and write data simultaneously, the controller 32 temporarily stores in the memory module 38 the source code 34A required by the procedure for changing the region code 34B.

Step 208

The controller 32 erases the region code 34B and the value in the counter 34C originally stored in the non-volatile memory 34, and executes the subsequent procedure of changing the region code 34B of the DVD drive 30 according to the source code temporarily stored in the volatile memory module 38.

Step 210

The controller 32 changes the current region code 34B as that requested by a user and increments the value in the counter 34C by one according to the source code temporarily stored in the volatile memory module 38. Then the controller 32 writes the changed region code 34B and the new value in the counter 34C into the non-volatile memory 34.

Step 212

The procedure of changing the region code 34B of the DVD drive 30 is completed. In the subsequent procedure of operating the DVD drive 30, the controller 32 controls the DVD drive 30 according to the source code 34A stored in the non-volatile memory 34.

Since the source code is first temporarily stored in the volatile memory module 38 according to the present invention, the controller 32 executes the key steps 208 and 210 by reading the source code temporarily stored in the volatile memory module 38 instead of reading the source code 34A through the non-volatile memory 34.

Therefore, the DVD drive 30 does not need an EEPROM to store the region code 34B and the value in the counter 34C. Instead, the region code 34B, the value in the counter 34C, and the source code 34A are all stored in the non-volatile memory 34 simultaneously.

In contrast to the prior art, a DVD drive that utilizes the present invention for changing a region code of the DVD drive does not need an additional EEPROM. Therefore, the cost of the DVD drive can be substantially reduced. Moreover, the circuit design of the DVD drive can also be simplified.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for changing a region code of an optical disc drive, the optical drive having:
   a first memory for storing the region code and a source code; and
   a second memory for storing data temporarily;
   the method comprising steps of:
   storing the source code in the second memory; and
   changing the region code in the first memory according to the source code stored in the second memory.

2. The method of claim 1, wherein the first memory is a flash memory.

3. The method of claim 1, wherein the second memory is a random access memory (RAM).

4. The method of claim 1 further comprising a step of executing subsequent tasks of the optical drive according to the source code stored in the first memory after the region code has been changed.

5. The method of claim 1, wherein the optical disk is a digital versatile disc (DVD) drive.

6. An optical disc drive for reading data in a digital versatile disc, the digital versatile disc drive comprising:
   a first memory for storing data temporarily;
   a second memory for storing a source code and a region code; and
   a controller for controlling the optical disc drive according to the source code;
   wherein for changing the region code, the controller stores the source code into the first memory, and then changes the region code according to the source code stored in the first memory.

7. The optical disc drive of claim 6, wherein the first memory is a random access memory (RAM).

8. The optical disc drive of claim 6, wherein the second memory is a flash memory.

9. The optical disc drive of claim 6, wherein after changing the region code, the controller controls the optical disc drive according to the source code stored in the second memory.

10. The optical disc drive of claim 6, wherein the optical disc drive is a digital versatile disc (DVD) drive.

* * * * *